(12) United States Patent
Ptashne

(10) Patent No.: US 12,479,258 B2
(45) Date of Patent: Nov. 25, 2025

(54) PROGRAMMABLE RIDE HEIGHT SYSTEM FOR AUTOMOBILES

(71) Applicant: Don Ptashne, Canoga Park, CA (US)

(72) Inventor: Don Ptashne, Canoga Park, CA (US)

( * ) Notice: Subject to any disclaimer, the term of this patent is extended or adjusted under 35 U.S.C. 154(b) by 0 days.

(21) Appl. No.: 18/770,643

(22) Filed: Jul. 11, 2024

(65) Prior Publication Data

US 2025/0018761 A1 Jan. 16, 2025

Related U.S. Application Data

(60) Provisional application No. 63/526,302, filed on Jul. 12, 2023.

(51) Int. Cl.
*B60G 17/018* (2006.01)
*B60G 17/019* (2006.01)

(52) U.S. Cl.
CPC ......... *B60G 17/018* (2013.01); *B60G 17/019* (2013.01); *B60G 2401/21* (2013.01); *B60G 2500/30* (2013.01); *B60G 2600/202* (2013.01)

(58) Field of Classification Search
CPC ............... B60G 17/018; B60G 17/019; B60G 2401/21; B60G 2500/30; B60G 2600/202
See application file for complete search history.

(56) References Cited

U.S. PATENT DOCUMENTS

| | | | | |
|---|---|---|---|---|
| 11,813,912 | B1* | 11/2023 | Ford | B60G 17/0162 |
| 2007/0257833 | A1* | 11/2007 | Nordmeyer | G01S 13/758 |
| | | | | 340/686.2 |
| 2018/0354336 | A1* | 12/2018 | Oakden-Graus | B60G 17/06 |
| 2020/0238782 | A1* | 7/2020 | Vaughan | F15B 1/08 |
| 2024/0092135 | A1* | 3/2024 | Randall | B60G 17/08 |

* cited by examiner

*Primary Examiner* — Toan C To

(57) ABSTRACT

A method and system for adjusting the height of a vehicle's air suspension through a software application or physical buttons or dials is provided. The system includes a ride height sensor that is configured to detect and measure the height of a vehicle. Further, the system includes an electronic module in communication with the ride height sensor and a ride height control module of the vehicle, wherein the ride height sensor or the electronic module being adapted to alter voltage/current or encoder data sent to the ride height control module. Further, the system includes means for electronically programming the ride height sensor or the electronic module, wherein the programming is performed using physical buttons or dials on the sensor or by connecting the electronic module to a user's electronic device via Bluetooth or other wireless or wired technology.

16 Claims, 7 Drawing Sheets

PROGRAMMABLE RIDE HEIGHT SYSTEM FOR AUTOMOBILES

CROSS-REFERENCE TO RELATED APPLICATIONS

The present application hereby claims priority to and incorporates by reference the entirety of the disclosures of the provisional application No. 63/526,302, entitled "PROGRAMABLE RIDE HEIGHT SYSTEM FOR AUTOMOBILES" filed on 12 Jul. 2023.

TECHNICAL FIELD

The present invention relates generally to actuators for use in a vehicle, and more particularly, to a method and system for adjusting the height of a vehicle's air suspension through a software application or physical buttons or dials.

BACKGROUND

Vehicle ride height control systems are essential for maintaining proper handling, stability, and comfort. Some vehicle owners want to set the vehicle to a lower height for either aesthetics or better handling and some vehicle owners want to set the vehicle to a higher height for aesthetics or to be able to accommodate larger wheels and tires or make the vehicle more accommodating for off-roading. Conventional ride height control systems typically utilize physical linkages and mechanical components to adjust the ride height of a vehicle. These mechanical systems offer limited adjustability and often provide linear adjustments, which restrict the precision and customization of ride height settings.

Currently, if a vehicle owner desires to exceed the predetermined range of motion set by the factory for the air suspension system, they typically install a different-sized linkage that attaches to the ride height sensors of the air suspension. In general, a vehicle has two to four ride height sensors, with each sensor positioned at one wheel and connected to the chassis around the inner wheel well, then linked to one of the control arms on each side. These ride height sensors incorporate a swing arm connected to either a potentiometer circuit or a digital encoder. The potentiometer circuit is the most commonly used type, where the vehicle's height corresponds to a specific voltage that is transmitted to the vehicle's ride height control module, informing the system about the current height of the vehicle.

A conventional ride height system is illustrated in FIG. 1. As shown in FIG. 1, an original equipment manufacturer (OEM) ride height sensor 101 is attached to a swing arm 102 and the swinging arm 102 is attached to a linkage 103. The main purpose of the ride height sensor 101 for the air suspension system is to provide the Electronic Control Unit (ECU) with information on the height position of the vehicle body. Besides supporting the air suspension system for automatic level control, ride height sensors are also used as input for the automatic headlight leveling system. Ride height sensors are so-called angle sensors meaning that when the sensor rod moves, an output signal (voltage) is generated that is proportional to its rotation angle. This signal is then transmitted to the ECU for further processing. The ride height sensor body itself is attached to the chassis and the linkage 103 is attached to the control arm of the vehicle.

By altering the length of the linkage 103 that connects the ride height sensor 101 to the control arm 102, the user can deceive the vehicle's computer into perceiving a different ride height. This manipulation allows the user to customize the ride height according to their preference, deviating from the factory settings. However, there are drawbacks to this approach. When using a different size linkage, such as to lower the vehicle, the maximum height that the car can achieve is also compromised. This limitation arises because the ride height controller is unaware of the presence of the altered linkages. Additionally, utilizing different-size linkages restricts the user from swiftly reverting to the factory preset heights. Before returning to the original settings, the user must manually readjust each linkage, making the process time-consuming and inconvenient.

Various attempts have been made to improve ride height control systems. For example, some aftermarket solutions involve replacing the OEM ride height sensors or installing mechanical linkages to modify the ride height. However, these solutions often lack the necessary flexibility to accommodate non-linear adjustments or to provide seamless integration with the OEM ride height system.

Currently, none of the existing systems and methods can provide an improved programmable ride height system for vehicles that can enhances the adjustability, customization, and precision of vehicle ride heights.

Although vehicle ride height control methods and systems are proposed in the past, they have their own shortcomings or limitations, thus there still exists a need for a more reliable solution that allows for electronic alteration of the voltages or encoder data being sent to the OEM ride height control module. Such an approach would provide users with greater control over their vehicle's ride height, allowing for precise adjustments and customization beyond the limitations of mechanical systems.

SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

In an embodiment, the present invention provides a system and method for adjusting the height of a vehicle's air suspension through a software application or physical buttons or dials. The system includes a ride height sensor that is configured to detect and measure the height of a vehicle. Further, the system includes an electronic module in communication with the ride height sensor and a ride height control module of the vehicle, wherein the electronic module is adapted to alter voltage/current or encoder data sent to the ride height control module. Further, the system includes means for electronically programming the ride height sensor or the electronic module, wherein the programming is performed using physical buttons or dials on the sensor or by connecting the electronic module to a user's electronic device via Bluetooth or other wireless or wired technology.

In an embodiment, the ride height sensor or the electronic module is configured to maintain programmed data without being connected to the user's electronic device or being connected in real-time to the user's electronic device to set the height on the fly.

In an embodiment, the ride height sensor comprises circuitry to function as an original equipment manufacturer (OEM) ride height sensor.

In an embodiment, the electronic module is configured to be installed in-line with the OEM ride height sensor and the ride height control module, a wiring harness connecting to the ride height sensor being unplugged and connected to the electronic module.

In an embodiment, the electronic module comprises circuitry to allow the OEM ride height sensor to pass along factory ride height data or voltage/current to the ride height control module.

In an embodiment, the electronic module is configured to recognize predetermined voltages/current or data from the ride height sensor and output corresponding voltages/current or data to the ride height control module, thereby enabling intelligent ride heights to be determined and set.

In an embodiment, the system further includes GPS circuitry either integrated into the electronic module or connected to the user's electronic device, wherein the programmable ride height system can change settings based on GPS location.

In an embodiment, the electronic module or ride height sensor is associated with a unique serial number for tracking, warranty purposes, and theft prevention.

In an embodiment, the electronic module is connected to a server through the user's electronic device, allowing for remote diagnostics and troubleshooting.

In an embodiment, a software application related to the programmable ride height system installed on the user's electronic device provides connectivity to the programmable ride height system for adjustment, firmware or software updates, bypassing, programming, deactivation, and other software-related tasks.

In an embodiment, the ride height sensor uses lasers to determine the vehicle's height instead of swing arms and linkages.

In an embodiment, the ride height system adjusts the ride height in a non-linear fashion, allowing for customized height settings beyond the linear scale provided by mechanical linkages.

In an embodiment, the method for adjusting ride height of the vehicle further includes adjusting the front and rear ride heights independently to avoid system errors or discrepancies in certain vehicle modes.

In an embodiment, the ride height system recognizes certain voltages or data from the ride height sensor and outputs predetermined voltages or data to the ride height control module, enabling coordinated operation with the OEM ride height system for enhanced ride height control.

These and other features and advantages of the present invention will become apparent from the detailed description below, in light of the accompanying drawings.

DETAILED DESCRIPTION

Figure 1:
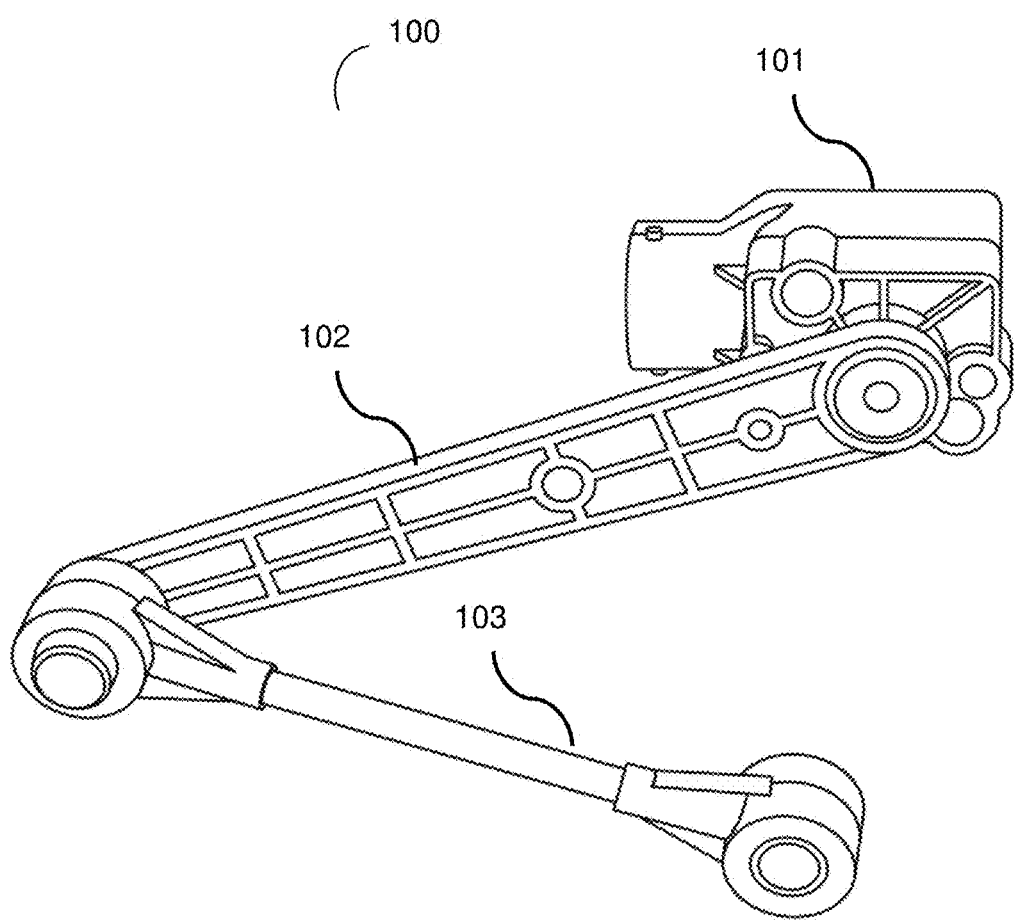
FIG. 1 illustrates a conventional ride height system that utilizes physical linkages and mechanical components to adjust the ride height of a vehicle.

As used in the specification, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. There may be additional components or processes described in the foregoing application that are not depicted on the described drawings. In the event, such a component or process is described, but not depicted in a drawing, the absence of such component and process from the drawings should not be considered as an omission of such design from the specification.

Before describing the present invention in detail, it should be observed that the present invention utilizes a combination of components or processes, which constitutes a system and method for adjusting ride height of a vehicle. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component-level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items. Further, the word "user" and "person" are used interchangeably in the description.

The system and method for adjusting ride height of a vehicle will now be described with reference to the accompanying drawings, particularly FIGS. 2-8.

Figure 2:
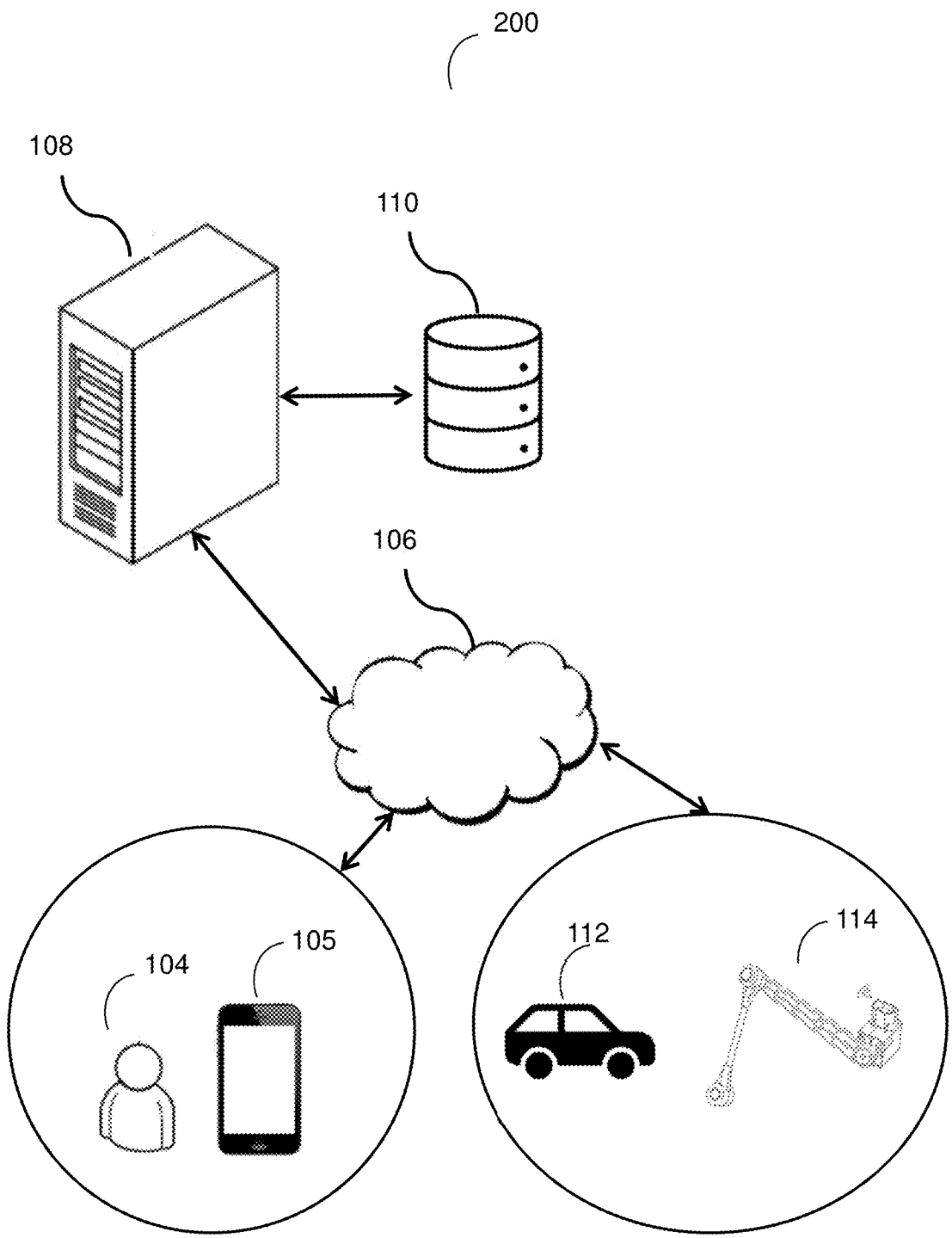
FIG. 2 illustrates general implementation for adjusting ride height of the vehicle, according to an exemplary embodiment of the present invention.

Referring to FIG. 2 in conjunction with FIGS. 3-8, a system 200 for adjusting the ride height of vehicle 112 is shown, in accordance with an exemplary embodiment of the present invention. Examples of vehicle 112 include but are not limited to motorcycles, cars, trucks, buses, mobility scooters, vans, crossover vehicles, and amphibious vehicles. The vehicle 112 can include a programmable ride height suspension system 114 that may include a front suspension system and a rear suspension system. Each suspension system may be associated with a ride height control module. In some embodiments, each ride height control module is included in an actuator assembly. In other embodiments, a single actuator assembly can be used to control both the front suspension system and the rear suspension system. Also, it should be understood that in some embodiments, the functionality performed by the ride height control modules is performed by one or more ride height control modules not included in an actuator assembly.

Through the ride height control module, the vehicle's suspension system can maintain a desired ride height, ensuring optimal performance, stability, and comfort. The module receives data from the ride height sensors, which measure the current height of the vehicle, and processes this information to make necessary adjustments to the suspension system. Based on the input received, the ride height control module can activate the appropriate actuators or components in the suspension system to raise or lower the vehicle's ride height. This control ensures that the vehicle maintains the desired height, whether in normal driving conditions or when encountering variations in terrain or load.

The ride height control module associated with each suspension system may receive a plurality input signals. In some implementations, at least some of the signals are provided by a ride height sensor located in the vehicle. The ride height sensor is configured to detect and measure the height of the vehicle 112. In an embodiment, the ride height sensor may be a part of the programmable ride height system 114. In another embodiment, the ride height sensor may be external to the programmable ride height system 114. It should be understood that other sensors and/or other control systems can provide the input signals in addition to or as an alternative to that described above.

The ride height sensors are strategically positioned in close proximity to each wheel. They are connected to both the chassis of the vehicle 112 and the control arms, which are integral parts of the suspension system. This positioning allows the sensors to accurately detect and capture the vertical position or height of the vehicle 112. By continuously monitoring the height, the ride height sensors provide essential feedback to the control system, such as the ride height control module. The sensors utilize various technologies, such as potentiometers or digital encoders, to convert the physical movement or displacement of the suspension components into electrical signals.

As the suspension system reacts to changes in load, terrain, or driver inputs, the ride height sensors detect the corresponding vertical movement and transmit this information to the control system. This data is crucial for maintaining the desired ride height and allowing the control system to make necessary adjustments. The connection of the ride height sensors to the chassis and control arms ensures that they accurately sense the movements of the suspension system. This enables the control system to continuously monitor and regulate the ride height, contributing to improved stability, comfort, and performance of the vehicle.

In an embodiment, the programmable ride height system 114 further includes an electronic module that communicates with the ride height sensor and the ride height control module of the vehicle 112. Strategically, the electronic module is positioned between the ride height sensors and the ride height control module. This placement allows the electronic module to intercept the signals transmitted by the ride height sensors before reaching the control module. This positioning is crucial for modifying the voltages or data that are sent to the ride height control module, thereby enabling the alteration of the ride height.

Inside the electronic module, there is circuitry specifically designed to perform this function. The circuitry is described in conjunction with the FIG. 3. This circuitry is responsible for processing the incoming signals from the ride height sensors and manipulating them according to the desired adjustments in ride height. The circuitry may include components such as microcontrollers, analog-to-digital converters, programmable logic, or other electronic elements necessary for signal manipulation.

The electronic module is configured to alter voltages or encoder data sent to the ride height control module. Further, the programmable ride height system 114 includes means for electronically programming the ride height sensor or the electronic module, wherein the programming is performed by using physical buttons or dials on the ride height sensor or by connecting the electronic module to a user's electronic device 105 via Bluetooth or other wireless or wired technology. In the context of the present invention, the user's electronic device 105 refers to an electronic device that can be used to communicate over a communication network 106. Examples of the user's electronic device 105 include but are not limited to a cell phone, a smart phone, a cellular phone, a cellular mobile phone, a personal digital assistant (PDA), a personal computer, a server, a cloud enabled devices, a laptop, a smart television, and a tablet computer. In an embodiment, the ride height sensor or the electronic module is configured to maintain programmed data without being connected to the user's electronic device or being connected in real-time to the user's electronic device to set the height on the fly.

Figure 5:
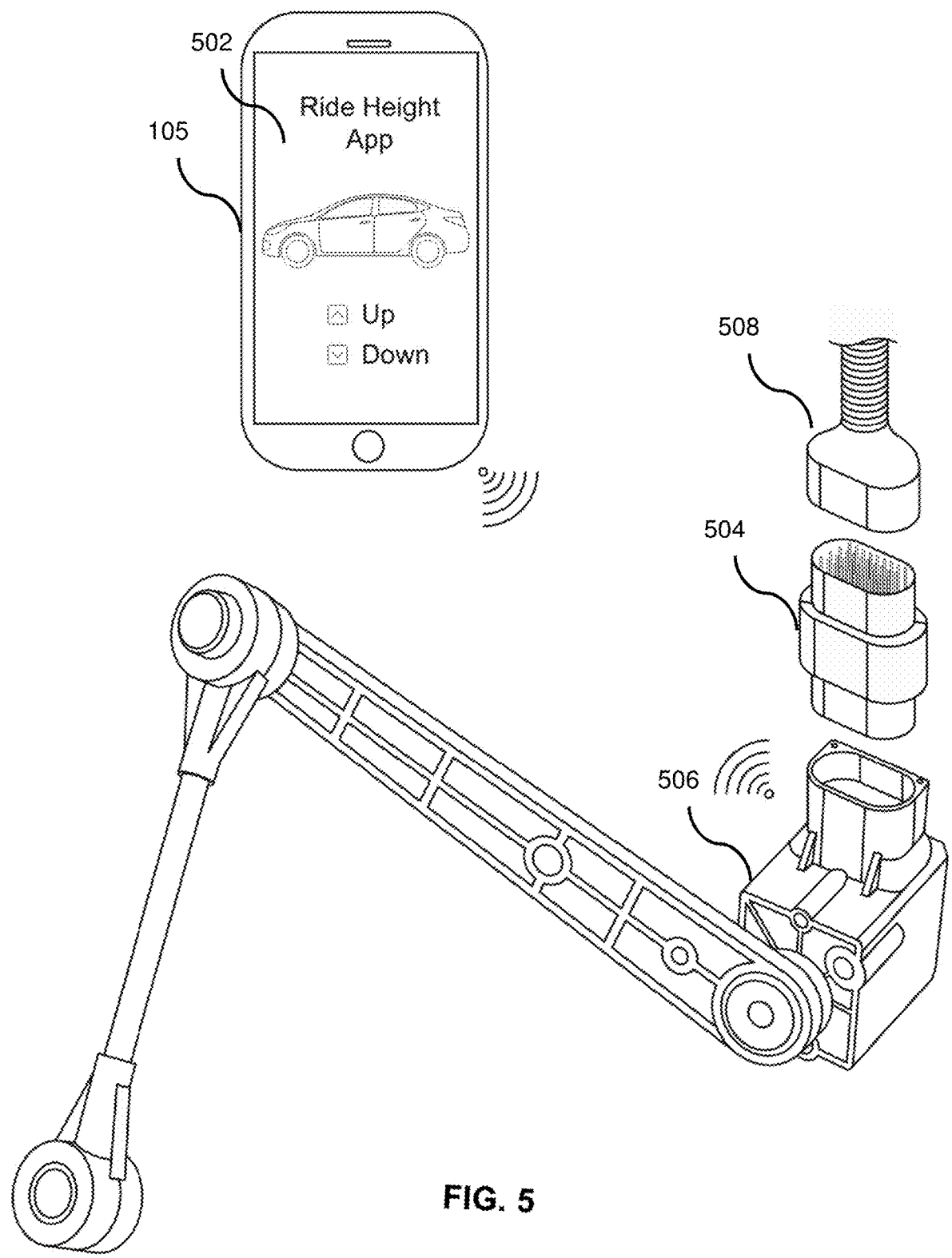
FIG. 5 illustrates an example user interface and connectivity options for programming and controlling the ride height system where the electronic module is configured to be installed in line with the OEM ride height sensor and the ride height control module, according to an embodiment of the present invention.

In an embodiment, the ride height sensor includes circuitry to function as an original equipment manufacturer (OEM) ride height sensor. Further, the electronic module is configured to be installed in line with the OEM ride height sensor and the ride height control module by unplugging a wiring harness that connects to the ride height sensor and connecting the wireless harness to the electronic module as illustrated in FIG. 5.

In an embodiment, the electronic module includes circuitry to allow the OEM ride height sensor to pass on factory ride height data or voltage to the ride height control module. Further, the electronic module is configured to recognize predetermined voltages or data from the ride height sensor and output corresponding voltages or data to the ride height control module, thereby enabling intelligent ride heights to be determined and set. The electronic modules act as a bridge, facilitating the integration between the ride height sensors and the ride height control module. They enable the ride height control module to receive modified signals that reflect the desired ride height settings, enhancing the flexibility and adaptability of the system.

Further, the electronic module or ride height sensor is associated with a unique serial number for tracking, warranty purposes, and theft prevention. In an embodiment, the electronic module is connected to server 108 via the communication network 106. Thus, allowing remote diagnostics and troubleshooting. Examples of types of the communication network 106 include, but are not limited to a local area network, a wide area network, a radio network, a virtual private network, an internet area network, a metropolitan area network, a satellite network, Wi-Fi, Bluetooth Low energy, a wireless network, and a telecommunication network. Examples of the telecommunication network include but are not limited to a global system for mobile communication (GSM) network, a general packet radio service (GPRS) network, third Generation Partnership Project (3GPP), 4G, 5G, 6G, Long-Term Evolution (LTE), an enhanced data GSM environment (EDGE) and a Universal Mobile Telecommunications System (UMTS).

Further, server 108 is connected to datastore 110 for storing diagnostics and troubleshooting related data. By establishing a connection to server 108, technical support personnel or authorized individuals gain the ability to remotely access and analyze the data from the electronic module. They can perform diagnostic tests, identify potential issues or malfunctions, and troubleshoot the system without physically being present with vehicle 112. This remote diagnostic capability offers several advantages. It allows for efficient and convenient troubleshooting, reducing the need for in-person inspections or visits to service centers. Technical support personnel can remotely assess the system's performance, identify any anomalies, and provide appropriate guidance or solutions to address the detected issues. Furthermore, the connection to the server enables the electronic module to receive firmware or software updates, ensuring that the ride height system remains up-to-date with the latest enhancements or bug fixes. This remote connectivity adds a layer of convenience, accessibility, and support in maintaining and optimizing the performance of the programmable ride height system 114.

In an embodiment, the programmable ride height system 114 includes GPS circuitry either integrated into the electronic module or connected to the user's electronic device, wherein the programmable ride height system can change settings based on GPS location. This GPS circuitry enables the programmable ride height system 114 to change its settings based on the vehicle's GPS location. By leveraging GPS technology, the system 114 can determine the precise geographic coordinates of the vehicle at any given time. This information allows the system 114 to automatically adjust the ride height settings based on predetermined parameters or user-defined preferences associated with specific locations. For example, when the vehicle enters a predefined location or geofenced area, the programmable ride height system 114 can receive the GPS data and trigger a corresponding adjustment in the ride height settings. This adjustment could be tailored to meet specific requirements or preferences associated with that particular location. It could include optimizing the ride height for comfort, performance, or even accommodating specific terrain conditions.

By incorporating GPS functionality, the programmable ride height system 114 enhances the adaptability and customization options available to the user. It allows for seamless and automated adjustments based on the vehicle's location, providing an optimized and tailored ride height experience in different geographical contexts.

Figure 3:
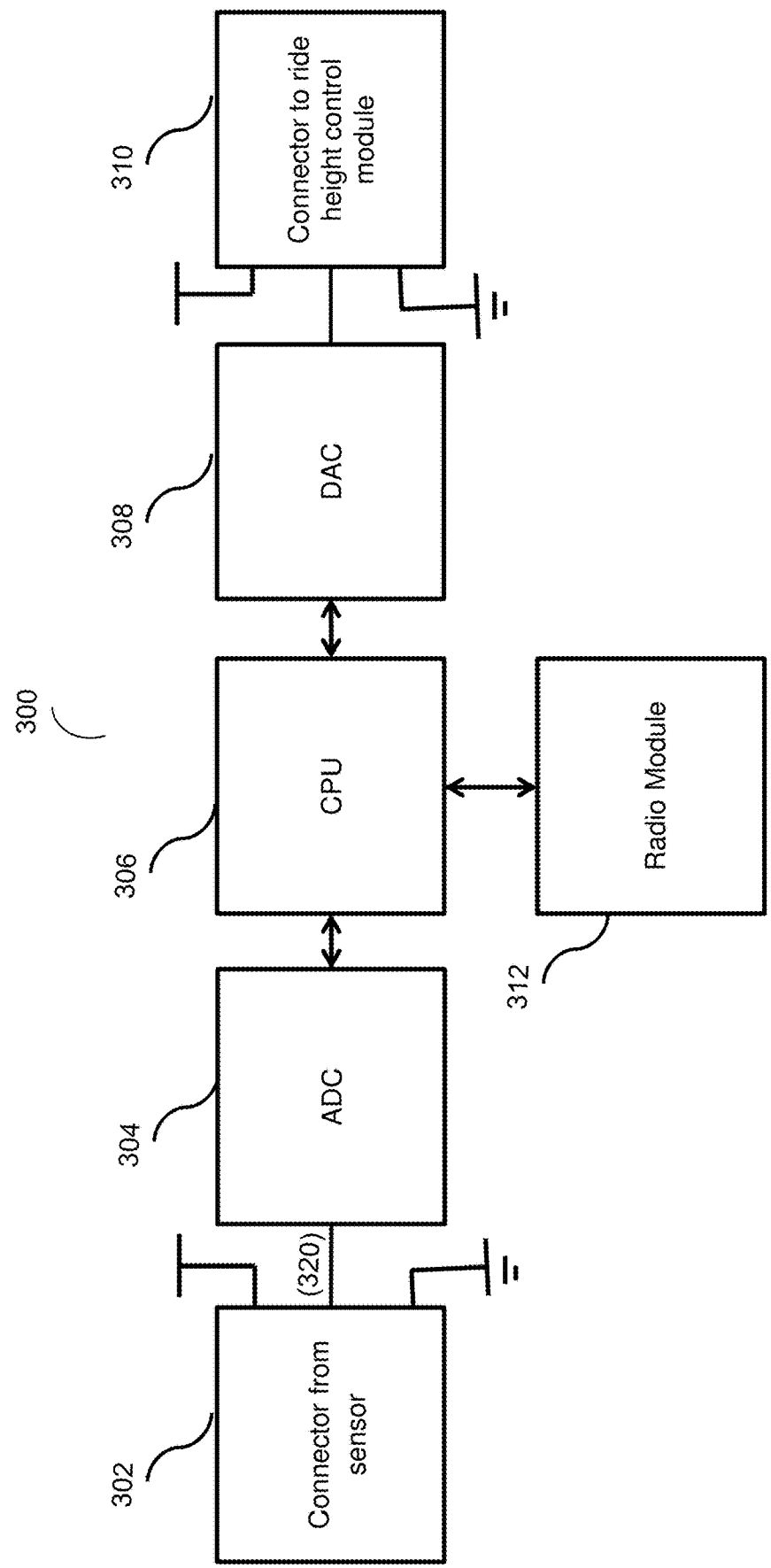
FIG. 3 is a block diagram illustrating a preferred architecture of an electronic module in communication with a ride height sensor and a ride height control module of the vehicle, according to an embodiment of the present invention.

FIG. 3 is a block diagram illustrating a preferred architecture of the electronic module in communication with the ride height sensor and the ride height control module of the vehicle 112, according to an embodiment of the present invention. As shown in FIG. 3, inside the electronic module, there are specific circuitry components that are purposefully designed to carry out their intended function within the programmable ride height system 114. This circuitry plays a crucial role in processing the signals received from the ride height sensors and manipulating them in accordance with the desired adjustments in ride height.

The circuitry within the electronic modules is responsible for various tasks related to signal processing and manipulation. These tasks may involve converting analog signals from the ride height sensors into digital format, performing calculations or adjustments based on predetermined algorithms, and generating output signals (i.e., digital to analog) compatible with the ride height control module. To fulfil these tasks, the circuitry may include several key components. For example, microcontroller (i.e., CPU 306) are often utilized to provide the necessary computational capabilities and control over the signal processing operations. The CPU 306 can execute programmed instructions to analyze and modify the incoming signals (320) from the ride height sensors.

The ride height sensor sends the signals (320) to the electronic module via connector 302. As shown, connector 302 from the sensor refers to the physical interface that allows the ride height sensor to establish a connection with the electronic module. It serves as a link between the sensor and the module, enabling the transmission of signals and data between the two components. The connector typically consists of a plug and socket mechanism, where the plug is attached to the sensor, and the socket is located on the electronic module. When the plug is inserted into the socket, it establishes an electrical connection, allowing the transfer of signals. The connector is designed to ensure a secure and reliable connection between the ride height sensor and the electronic module. It is engineered to provide proper alignment and contact between the corresponding pins or terminals on the plug and socket. This ensures that the signals from the sensor, which carry information about the current ride height, can be accurately transmitted to the electronic module for further processing. The connector may also incorporate features such as locking mechanisms or sealing gaskets to ensure a secure and robust connection. These features help prevent accidental disconnection or the ingress of moisture, dirt, or other contaminants that could potentially affect the signal transmission or compromise the overall performance of the system.

As shown, Analog-to-digital converter (ADC) 304 are commonly integrated into the circuitry to convert the analog signals produced by the ride height sensors into digital data that can be further processed by the microcontrollers (i.e., CPU 306). ADC enables precise measurement and quantization of the ride height information for subsequent manipulation. Further, the digital signal is processed by programmable logic devices, such as programmable logic controllers (PLCs) or field-programmable gate arrays (FPGAs), may also be included in the circuitry. In an embodiment, the PLCs or FPGAs are part of CPU 306. In another embodiment, the PLCs or FPGAs are separate modules. The PLCs or FPGAs offer flexibility in configuring and adapting the signal manipulation operations according to specific requirements. They can be programmed to implement custom algorithms or perform complex calculations for achieving the desired adjustments in ride height.

Further, the modified signal is again converted to an analog signal by a Digital-to-Analog (DAC) module 308.

The purpose of the DAC 308 in the electronic module is to convert the digital signals received from the electronic module into analog voltages that are compatible with the ride height control module. The ride height control module typically operates using analog voltages to adjust and control the vehicle's ride height. Once the electronic module receives the processed signals from the ride height sensors and performs any necessary adjustments or manipulations, it sends the resulting digital signals to the DAC 308. The DAC 308 then converts these digital signals into analog voltages proportional to the desired ride height adjustments. The analog voltages generated by the DAC 308 are then transmitted through the connector to the ride height control module. The ride height control module uses these analog voltages as input to determine the appropriate adjustments to be made to the vehicle's suspension system.

Additionally, other electronic elements might be incorporated into the circuitry as needed. These elements could include amplifiers, filters, memory modules, or communication interfaces, for example, radio module 312 to facilitate signal amplification, noise reduction, data storage, or seamless communication with other components of the system.

The radio module 312 serves as a means of wireless communication between the electronic module and the user's electronic device, such as a cell phone, tablet, or laptop. Its function is to establish a connection and enable data transmission between these devices. The radio module 312 utilizes radio frequency technology, such as Bluetooth or other wireless protocols, to establish a wireless link between the electronic module and the user's electronic device. This allows for convenient and remote access to the programmable ride height system. The radio module 312 enables the transmission of data between the electronic module and the user's electronic device. This includes the exchange of ride height settings, adjustments, and commands.

By utilizing the radio module 312, the user 104 can remotely control and adjust the ride height settings of the vehicle 112 using their electronic device 105. They can send commands or inputs, such as selecting a specific ride height or adjusting the suspension parameters, wirelessly to the electronic module. The radio module 312 also facilitates real-time monitoring of the ride height system. It allows the user 104 to receive feedback, status updates, and diagnostic information from the electronic module on their electronic device 105, providing them with information about the current ride height and system performance. The radio module 312 enables the wireless transmission of firmware or software updates to the electronic module. This ensures that the system stays up-to-date with the latest features, enhancements, and bug fixes.

Figure 4:
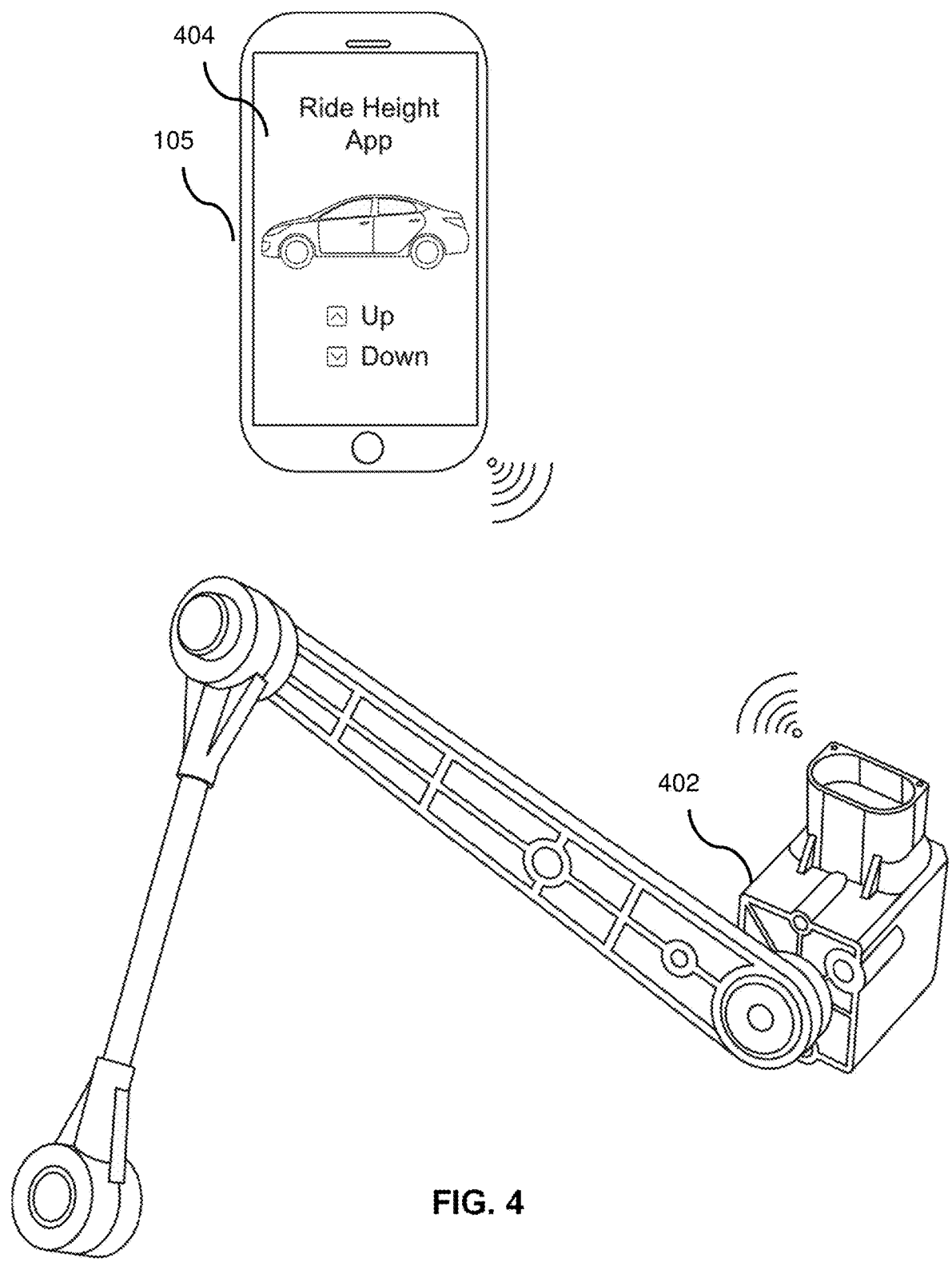
FIG. 4 illustrates an example user interface and connectivity options for programming and controlling the ride height system where the electronic module is integrated to the original equipment manufacturer (OEM) sensor in the vehicle, according to an embodiment of the present invention.

FIG. 4 illustrates an example user interface 404 and connectivity options for programming and controlling the programmable ride height system 402 where the electronic module is integrated to the original equipment manufacturer (OEM) sensor in the vehicle 112, according to an embodiment of the present invention. The user interface 404 refers to a graphical interface or software application that allows the user 104 to interact with the programmable ride height system and make desired adjustments. It can be accessed through the user's electronic device 105, such as a cell phone, tablet, laptop, or other compatible device.

The user interface 404 offers controls or settings that enable the user 104 to adjust the ride height of the vehicle 112. This can include options to raise or lower the vehicle's suspension to their preferred level within the allowable range. The user interface 404 may provide predefined preset height options for quick adjustments. The user 104 can select from a range of preset ride heights, such as "low," "medium," or "high," based on their preferences or specific driving conditions. Further, the user interface 404 allows for custom height programming, enabling the user 104 to define and save their preferred ride height settings. This can involve specifying precise height values or percentages for individual wheels or the entire vehicle. Furthermore, the user interface 404 provides connectivity options to establish a connection between the user's electronic device 105 and the electronic module integrated with the OEM sensor. This can be achieved through Bluetooth, Wi-Fi, or other wireless technologies, as well as wired connections if available. Furthermore, the user interface 404 may include real-time monitoring features, displaying the current ride height of the vehicle and any changes made in response to user inputs. This allows the user 104 to observe and verify the adjustments in real-time. Furthermore, the user interface 404 can provide diagnostic information and alerts regarding the ride height system. It may display system status, error messages, or notifications related to sensor readings, communication issues, or other relevant parameters.

As discussed above, the programmable ride height system can be configured to respond to specific voltages or data signals generated by the ride height sensors. When these signals are detected, the programmable ride height system can generate predetermined voltages or data outputs that are sent to the vehicle's ride height controller. This enables the programmable ride height system to work in conjunction with the OEM ride height system, allowing for more intelligent determination and adjustment of ride heights. Consider a scenario, suppose the user desires to select the "low" setting using the vehicle's screen or user interface 404. In such a scenario, the programmable ride height system could set an even lower position than the OEM-defined "low" setting. Simultaneously, if the user 104 then chooses the "high" setting, the programmable ride height system would recognize this selection by measuring the voltage/current or interpreting the incoming encoder data. Consequently, the vehicle would be allowed to reach the OEM-defined "high" ride height setting. This approach ensures that the user retains access to the OEM-defined "high" settings, which would otherwise be lost when using a physical linkage-based system. By leveraging voltage measurements or encoder data, the programmable ride height system can dynamically adjust and synchronize with the OEM ride height system. This capability enhances the user's control over the ride height, enabling them to achieve customized and precise ride height settings that go beyond the limitations of the OEM presets.

Generally, when the user 104 selects one of the preset heights on the user interface 404, the air suspension will raise or lower until the ride height sensor sends back a particular voltage/current that the ride height controller is looking for. This voltage/current discloses the ride height controller that the vehicle has reached the preset height. When the electronic module receives this voltage/current information it can then either copy and send along this same voltage/current to the ride height controller or send a different voltage/current to put the car into a different height that is not accessible with the factory settings. This is useful when the user wants to maintain the factory ride height adjustability for the High or Very High settings and wants to make the Medium or Low setting lower than the OEM presets.

Let's consider a situation where the factory presets for ride height settings are defined as follows: "Very High" at 2.0V, "High" at 2.5V, "Medium" at 3.0V, and "Low" at 3.5V. With the electronic module positioned between the ride height sensor and the ride height controller, the programmable ride height system gains the ability to manipulate voltage/current readings as needed. One common application of this capability is to maintain the original voltage readings for "Very High," "High," and "Medium" settings while manipulating the voltage/current reading for the "Low" setting.

In this scenario, when the electronic module reads a voltage of 3.5V from the ride height sensor but the user selects a different height (voltage/current), the electronic module can send back a voltage to the ride height controller, such as 3.2V (0.3V offset), for example. Consequently, the ride height controller will continue lowering the vehicle until the user's electronic device (e.g., 105) provides feedback indicating a voltage of 3.5V. It is important to note that the ride height sensor can be at a voltage reading of 4.5V or any other value depending on the user's chosen voltage offset. In this specific case, the offset for the "Low" position is set to 0.3V, while for the other height settings, the offset remains neutral or 0.0V.

FIG. 5 illustrates an example user interface 502 and connectivity options for programming and controlling the ride height system where the electronic module 504 is configured to be installed in line with the OEM ride height sensor 506 and wiring harness 508 of the ride height control module, according to an embodiment of the present invention. In this context, the diagram depicts an example user interface 502 and various connectivity options for programming and controlling the ride height system. The user interface serves as a platform through which the user can interact with the system and make adjustments. The connectivity options enable the connection between the user interface and the ride height system components.

Specifically, the electronic module 504 is designed to be installed in line with the OEM ride height sensor 506 and the wiring harness 508 of the ride height control module. This configuration allows the electronic module to interface directly with the OEM sensor and harness, facilitating seamless communication and data exchange between the components. The user interface 502 and connectivity options provide a means for the user to program and control the ride height system effectively. By connecting the electronic module in line with the OEM ride height sensor and wiring harness, the user gains the ability to utilize the user interface for configuring settings, making adjustments, and controlling the ride height system according to their preferences.

For an example, the wiring harness 508 is a collection of electrical wires and connectors that are bundled together and designed to transmit electrical signals and power between various components of a system. In the context of the ride height system, the wiring harness serves as a pathway for electrical communication between the electronic module 504 and other components of the programmable ride height system. The wiring harness 508 is connected to the electronic module 504 through a series of electrical connections. These connections may include plugs, sockets, or other types of connectors that ensure a secure and reliable connection between the wiring harness and the electronic module. The specific details of the connection will depend on the design and specifications of the programmable ride height system.

Figure 6:
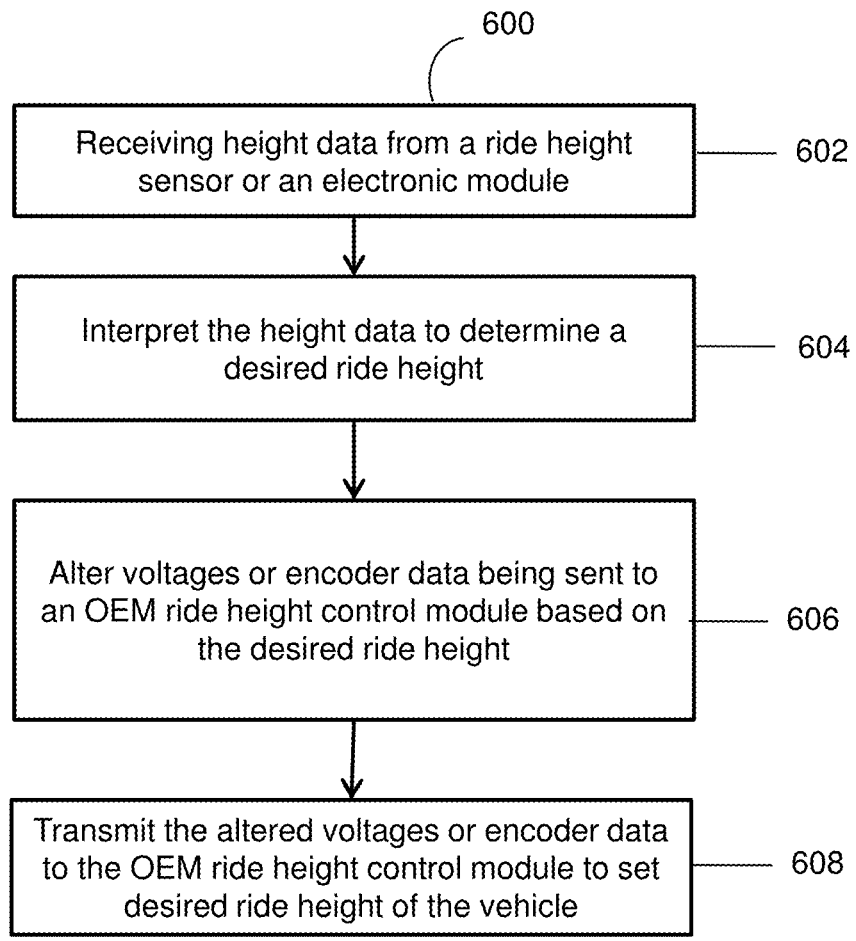
FIG. 6 illustrates a flow diagram of a method for adjusting the ride height of the vehicle, according to an exemplary embodiment of the present invention.

FIG. 6 illustrates a flow diagram 600 of a method for adjusting the ride height of the vehicle 112, according to an exemplary embodiment of the present invention. At step 602, the method includes receiving height data from the ride height sensor or the electronic module. The method allows the programmable ride height system to receive height data from the ride height sensor or the electronic module.

At step 604, the method includes interpreting the height data to determine a desired ride height. The method allows the programmable ride height system to interpret the height data to determine a desired ride height. At step 606, the method includes altering the voltage/current or encoder data being sent to the OEM ride height control module based on the desired ride height. The method allows the programmable ride height system to alter the voltage/current or encoder data being sent to the OEM ride height control module based on the desired ride height.

At step 608, the method includes transmitting the altered voltage/current or encoder data to the OEM ride height control module to set desired ride height of the vehicle 112. The method allows the programmable ride height system to transmit the altered voltage/current or encoder data to the OEM ride height control module to set desired ride height of the vehicle 112.

The various actions, acts, blocks, steps, or the like in the flow diagram may be performed in the order presented, in a different order, or simultaneously. Further, in some embodiments, some of the actions, acts, blocks, steps, or the like may be omitted, added, modified, skipped, or the like without departing from the scope of the invention.

Figure 7:
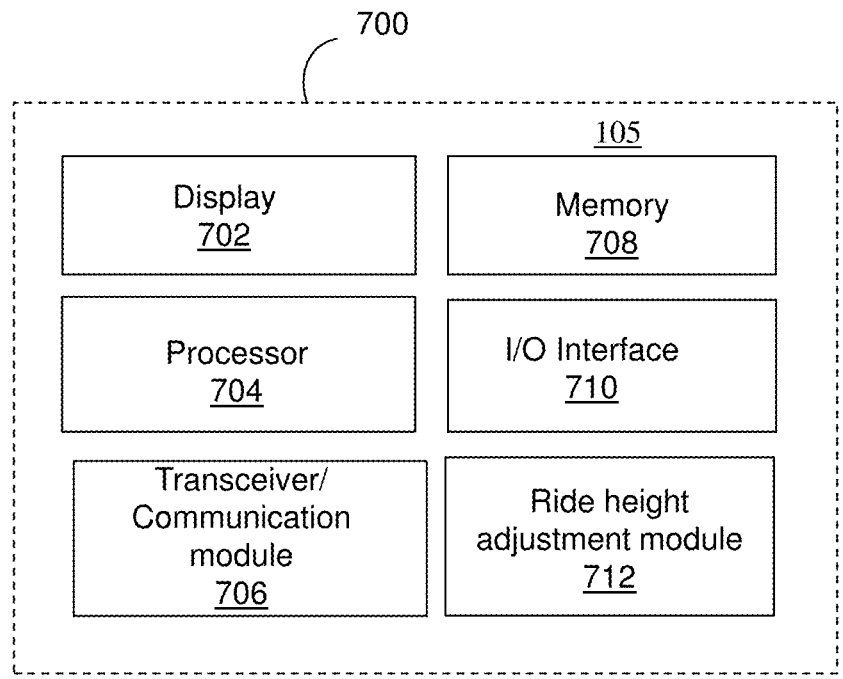
FIG. 7 is a block diagram illustrating a user's electronic device, according to an exemplary embodiment of the present invention.

FIG. 7 is a block diagram illustrating user's electronic device, according to an exemplary embodiment of the present invention. In accordance with an example implementation, as shown in FIG. 7, the system 700 may include at least a processor 704, a memory 708, a transceiver or communication module 706, one or more I/O interfaces, such as an I/O interface 710, a ride height adjustment module 712, and a display 702.

The processor 704 may be communicably coupled with the transceiver/communication module 706 to receive the input signal from the ride height sensor and send modified signal to the ride height controller. The processor 704 is in communication with the memory 708, configured in the form of routines, programs, objects, components, data structures and the like, which perform particular tasks to be executed by the processor 704. The system 700 may be connected to other information processing devices by using the I/O interface 710. The I/O interfaces 710 may include a variety of software and hardware interfaces, for instance, interface for peripheral device(s) such as a keyboard, a mouse, a scanner, an external memory, a printer and the like. In an embodiment, the processor 704 may include different types of processors known in the art including neural network-based algorithms that are effectively used in several applications.

Further, the ride height adjustment module 712 is configured to provide the user 104 with a dedicated interface or application for controlling and adjusting the ride height of the vehicle 112. Through the module's user interface, the user 104 can access various features and settings related to the ride height adjustment. The ride height adjustment module 712 provides options for the user to select and customize the desired ride height settings. This may include predefined settings such as "Very High," "High," "Medium," and "Low," or even the ability to set a specific ride height value manually. The user 104 can simply input their desired ride height preference through the module, and the electronic module in the vehicle's ride height system will receive and process this information.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The proposed programmable ride height system provides many advantages over the existing methods and systems. Some vehicle owners have a preference for lowering their vehicles to achieve a specific aesthetic appearance when parked. The programmable ride height system offers the capability to adjust the vehicle's ride height to its maximum range of motion allowed by the existing suspension system. This means that users can lower their vehicles to the desired extent for aesthetic purposes, taking full advantage of the available suspension capabilities. Additionally, the programmable ride height system serves another important function, which is to address potential errors that may occur in certain modes of the OEM system where different front-to-rear ride heights are required. As an example, in specific vehicles, there is a mode known as Cheetah mode, which involves the front air suspension dipping down to its lowest position while the rear remains unchanged. However, when using standard aftermarket lowering linkages, this can sometimes trigger system errors because the OEM ride height system expects specific values that are not met when mechanical lowering links are used. Since the front has lowered to its maximum capacity already and cannot go lower, the ride height sensors then fail to report back sensor voltages that the OEM ride height system expects to see.

By implementing the programmable ride height system, it becomes possible to program and control the front and rear ride heights independently, ensuring that the OEM system receives the expected values. This intelligent control of the front and rear ride heights helps avoid system errors and ensures smooth operation even in modes that require different front-to-rear ride height configurations.

Further, the system allows users to adjust and customize their vehicle's ride height according to their preferences. This level of customization provides an opportunity for individual expression and personalization. Users can lower their vehicles to the maximum range of motion permitted by their suspension system. This feature is particularly appealing to vehicle enthusiasts who seek a visually appealing aesthetic when their vehicles are parked. Furthermore, the system is designed to work in harmony with the original equipment manufacturer (OEM) ride height system. It ensures that the OEM system receives the necessary data and values, thus avoiding system errors or malfunctions. Furthermore, the programmable ride height system can accommodate different front-to-rear ride height configurations, which helps prevent system errors that may occur in certain modes or situations. By programming and controlling the front and rear ride heights independently, the system ensures that the OEM system functions properly without any unexpected errors. The integration of the electronic module with the user's electronic device allows for remote diagnostics and troubleshooting. This feature enables convenient monitoring and analysis of the ride height system's performance, simplifying maintenance and ensuring optimal functionality.

Further, the system is accompanied by a user-friendly software application installed on the user's electronic device. This interface provides intuitive controls for adjusting the ride height, performing diagnostics, updating firmware, and configuring system settings. It enhances the user experience by offering a seamless and convenient way to interact with the ride height system.

Although particular embodiments of the invention have been described in detail for purposes of illustration, various modifications, and enhancements may be made without departing from the spirit and scope of the invention.

What is claimed is:

1. A programmable ride height system comprising:
    a ride height sensor configured to detect and measure the height of a vehicle;
    an electronic module in communication with the ride height sensor and a ride height control module of the vehicle, the electronic module is adapted to alter voltages/current or encoder data sent to the ride height control module;
    means for electronically programming the ride height sensor or the electronic module, wherein the programming is performed using physical buttons or dials on the ride height sensor or by connecting the electronic module to a user's electronic device via Bluetooth or other wireless or wired technology;
    wherein the ride height sensor or the electronic module is configured to maintain programmed data without being connected to the user's electronic device or being connected in real-time to the user's electronic device to set the height on the fly.

2. The programmable ride height system of claim 1, wherein the ride height sensor comprises circuitry to function as an original equipment manufacturer (OEM) ride height sensor.

3. The programmable ride height system of claim 1, wherein the electronic module is configured to be installed in-line with the ride height sensor and the ride height control module, a wiring harness connecting to the ride height sensor being unplugged and connected to the electronic module.

4. The programmable ride height system of claim 1, wherein the electronic module comprises circuitry to allow the ride height sensor to pass on factory ride height data or voltage to the ride height control module.

5. The programmable ride height system of claim 1, wherein the electronic module is configured to recognize predetermined voltages or data from the ride height sensor and output corresponding voltages or data to the ride height control module, thereby enabling intelligent ride heights to be determined and set.

6. The programmable ride height system of claim 1, further comprising GPS circuitry either integrated into the electronic module or connected to the user's electronic device, wherein the programmable ride height system can change settings based on GPS location.

7. The programmable ride height system of claim 1, wherein the electronic module or ride height sensor is associated with a unique serial number for tracking, warranty purposes, and theft prevention.

8. The programmable ride height system of claim 1, wherein the electronic module is connected to a server through the user's electronic device, allowing for remote diagnostics and troubleshooting.

9. The programmable ride height system of claim 1, wherein a software application related to the programmable ride height system installed on the user's electronic device provides connectivity to the programmable ride height system for adjustment, firmware or software updates, bypassing, programming, deactivation, and other software-related tasks.

10. The programmable ride height system of claim 1, wherein the ride height sensor uses lasers to determine the vehicle's height instead of swing arms and linkages.

11. A method for adjusting a ride height of a vehicle using a ride height system that comprises; a ride height sensor, an electronic module in communication with the ride height sensor, and a ride height control module of the vehicle, the method comprising;
- receiving height data from the ride height sensor or the electronic module;
- interpreting the height data to determine a desired ride height;
- altering voltages or encoder data being sent to an OEM ride height control module based on the desired ride height; and
- transmitting the altered voltages or encoder data to the OEM ride height control module to set desired ride height of the vehicle.

12. The method of claim 11, further comprising programming the ride height sensor or the electronic module using physical buttons or dials on the sensor or by connecting to a user's electronic device via Bluetooth or other wireless or wired technology.

13. The method of claim 12, wherein the ride height sensor or the electronic module maintains programmed data without being connected to the user's electronic device or is connected in real-time to the user's electronic device to adjust the ride height on the fly.

14. The method of claim 11, wherein the ride height system adjusts the ride height in a non-linear fashion, allowing for customized height settings beyond the linear scale provided by mechanical linkages.

15. The method of claim 11, further comprising adjusting a front ride height and a rear ride heights of the vehicle independently to avoid system errors or discrepancies in certain vehicle modes.

16. The method of claim 11, wherein the ride height system recognizes certain voltages or data from the ride height sensor and outputs predetermined voltages or data to the ride height control module, enabling coordinated operation with the ride height system for enhanced ride height control.

* * * * *